July 20, 1965 IWAO UOZUMI 3,195,393
SHAFT WITH OVERLAPPING COTTER PIN RECEIVING HOLES
Filed April 24, 1963 2 Sheets-Sheet 1
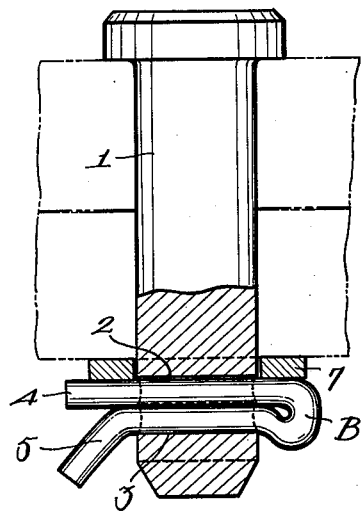
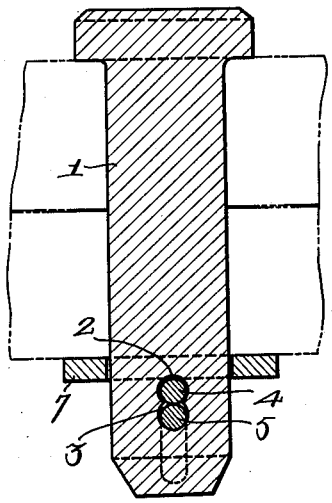
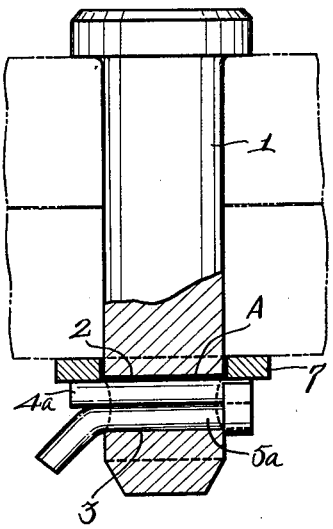
INVENTOR.
Iwao Uozumi
BY United States Patent Office 3,195,393
Patented July 20, 1965

3,195,393
SHAFT WITH OVERLAPPING COTTER PIN RECEIVING HOLES
Iwao Uozumi, 607 7-chome, Ebara, Shinagawa-ku, Tokyo, Japan
Filed Apr. 24, 1963, Ser. No. 275,446
Claims priority, application Japan, Apr. 26, 1962 (utility model), 37/20,769
4 Claims. (Cl. 85—8.1)

The present invention relates to an improved split pin device, and more particularly to an improved split pin and shaft combination which effectively prevents a wheel or washer from coming off the shaft or a bar shape body on which said wheel or washer is fixedly mounted.

It is a common practice in the art that when a rotary member such as a wheel is mounted on a bar-shape body such as a shaft, a split pin is transversely inserted through the shaft containing bores provided thereon so that the wheel may be prevented from coming off the shaft together with its associated washer or washers.

However, if such bores for inserting the split pin are round in shape, when the split pin is inserted through the round bores, there remain clearances between the inner walls of such bores and the leg portions of the split pin. Such clearances mean waste in the material of the shaft and reduce the strength of the shaft to that extent. It is preferable that the bores for a split pin be formed with a cross-sectional area just sufficient to permit the leg portions of the split pin to pass therethrough and where such bores have a large cross-sectional area more than sufficient to allow the split pin leg portions to pass through, they naturally reduce the strength of the shaft or bar shape body.

It is also a common practice in the art to provide rectangular bores on a shaft or bar shaped body for the insertion of a split pin therethrough. Although such square shaped bores may be somewhat advantageous over round bores so far as the strength of such a shaft is concerned, but the square shaped bores have an inherent disadvantage that square bores require a rather complicated process for drilling them and accordingly, a higher processing expense as compared with round bores.

It is an object of the present invention to prevent the weakening of a shaft or bar shape body by the provision of split pin insertion bores whose diameter is just sufficient to permit the leg portions of a split pin to pass therethrough whereby to eliminate wasteful clearances between the inner walls of the bores and the leg portions of the split pin which would otherwise appear.

It is another object of the present invention to prevent wear in contact areas between a split pin and bores through which said pin is inserted whereby to insure a long service life for the split pin and the shaft in which said insertion bores are formed.

It is still another object of the present invention to make the drilling process of bores on a shaft easier and simpler whereby to reduce the processing expense for such bores.

It is still another object of the present invention to make the bending process of a split pin simpler and easier.

For the above purpose, according to the present invention, a shaft or bar shape body is provided with two round bores having a diameter just sufficient to permit the leg portions of a split pin to pass therethrough, and the arrangement of the bores is such that the two round bores may partially communicate with each other at their adjacent peripheral areas.

The diameter of the pin insertion bores is preferably as close as the outer diameter of a split pin to the utmost practicable within a range in which the insertion of such a pin is possible, and according to the present invention, two round bores are drilled on a shaft in such a manner that the bores are aligned in an axial direction of the shaft with their adjacent peripheral areas partially overlapping each other, a result of such an arrangement being that the axially aligned bores communicate with each other at portions of their adjacent peripheries to form a cocoon shape bore portion to receive the cotter or split pin.

According to the present invention, a length of steel wire of circular cross section is employed for such a split pin. The steel wire is folded so as to form two parallel leg portions which differ in length from each other, or two separate pieces of steel wire which have different lengths are employed and corresponding ends of the two pieces of steel wire are secured to each other. The leg portions or two separate wires are inserted into the separate bores and then the longer leg portion or wire is outwardly bent at its free end whereby to form a split pin which serves as a detent means for preventing a wheel or washer from coming off the shaft.

The manner in which these and other objects, features and advantages of the present invention may be attained, will be apparent from the following detailed description of the invention referring to the accompanying drawings which illustrate preferred embodiments of the present invention and in which:

FIG. 1 is a top view of an embodiment of the present invention with a portion thereof shown in cross section.

FIG. 2 is a view similar to FIG. 1, but shows the embodiment entirely in cross section taken at a right angle with respect to FIG. 1.

FIG. 3 is a view similar to FIG. 1, showing a portion thereof in cross section but with a modified split pin.

FIG. 4 is an end view of the modified split pin as shown in FIG. 3.

Figure 6:
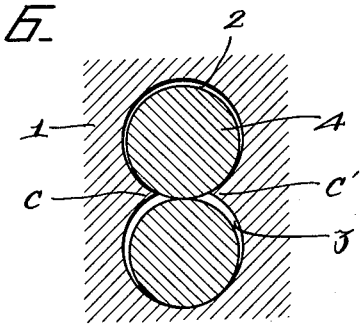
FIG. 6 is a view which shows the relation between the split pin and bores for inserting the same therein.

As shown in these figures, a shaft or bar shape body 1 is provided with a bore portion A comprising two transversely extending parallel bores 2 and 3 through which the leg portions of a split pin B are inserted. Said bores 2 and 3 are arranged in parallel in an axial direction of the shaft in such a manner that they partially communicate with each other at their adjacent peripheral areas so as to form a cocoon shape in cross section. Accordingly, the bore portion A has a pair of inwardly facing projections C and C' (see FIG. 6) formed on the opposite inner walls at the junction of the two bores 2 and 3 and the projections C and C' define the boundary for the two bores through which the respective leg portions 4 and 5 of a split pin B are inserted.

The split pin B is made from a length of steel wire having a circular cross-section and formed by the folding of the steel wire so as to form two leg portions 4 and 5 having different lengths from each other as shown in FIGS. 1 and 2. The shorter leg portion 4 and the longer leg portion 5 are disposed in a close parallel relation to each other, or as shown in FIGS. 3 and 4, the split pin B may be formed two pieces of steel wires $4_a$ and $4_b$ having different lengths from each other. Corresponding ends of the respective steel wires are aligned and a protective steel piece 6 is applied around the aligned end portions of said steel wires and thereafter the end portions and protective piece are secured together by welding. The shorter leg portion 4 or shorter wire $4_a$ is inserted through the bore 2 adjacent to a washer 7 on the shaft 1 whilst the longer leg portion 5 or longer wire $5_a$ is inserted through the other bore 3, and thereafter, the free end of the longer leg portion 5 or longer wire $5_a$ is outwardly bent whereby the split pin B may be prevented from slipping out of the bore portion A.

Figure 5:
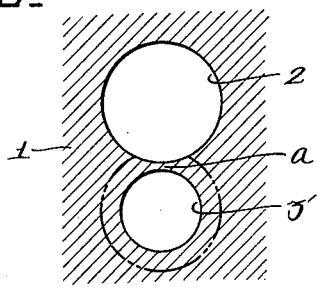
FIG. 5 is a view which explains the drilling process to provide the bores for inserting the split pin.

The drilling process of the bore portion A on the shaft 1 dose not constitute a part of the present invention, but a brief description on the bore drilling process will be given herein for better understanding of the invention. As shown in FIG. 5, one interim bore 3' whose diameter is smaller than that of any one of the completed bores 2 or 3 is firstly drilled on the shaft 1 so as to leave a boundary layer $a$ between the other bore 2 and said interim bore 3', and the interim 3' is then re-drilled with the employment of the same drill employed for drilling the bore 2 as indicated by the circular chain line in FIG. 5 thereby to eliminate the boundary layer $a$ and obtain the desired cocoon shape bore portion A.

With the shaft 1 provided with the bore portion A as described above, when the split pin B is inserted into thus formed bore portion A and later subjected to thrust force, the leg portion 5 or wire 5' is forced against the inner wall of the bore 3 whilst the other leg portion 4 or wire member 4' is received at the inwardly facing projections C and C' on the opposite sides thereof, whereby the respective leg portions or wires are individually supported. Therefore, the split pin is rigid enough to withstand a substantial bending force which may be applied thereupon at any substantial pressure and furthermore, the novel split pin is subject to wear action which insures a long service life for the same.

Figure 7:
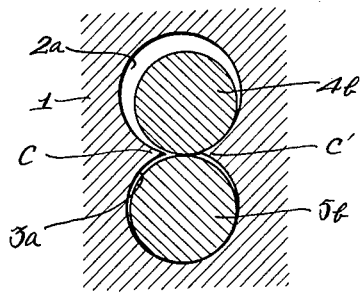
FIG. 7 is a view which shows modified bores according to the present invention.

FIG. 7 shows a modified embodiment of the present invention in which one bore $2_a$ of the bore portion A is made as having a larger diameter than that of the other bore $3_a$. With the different diameter bores, the leg portion $4_b$ of the split pin within the larger bore $2_b$ is continuously forced to contact with either one of the inwardly facing projections C and C' whereby thrust force to which the leg portion $4_b$ is subjected will not be directly applied upon the other leg portion $5_b$, accordingly, wear in the smaller bore $3_a$ and split pin leg portion $5_b$ will be substantially decreased.

While particular embodiments of the present invention have been shown and described, it will be understood that various parts are capable of modification and variation without departing from the principles of the invention and that the scope of the invention should be limited only by the scope and proper interpretation of the claims appended hereto.

The invention having thus been described, what is believed to be new and desired to be protected by Letters Patent is:

What I claim is:

1. A cotter pin and shaft combination of improved strength and wear resistance comprising
   a cotter pin of the type formed of two substantially cylindrical legs of substantially the same diameter, said legs being connected at one end, having intermediate portions in contact and end portions adapted to be divergently bent,
   a shaft having an end portion containing a pair of transverse cylindrical bores of a slightly larger diameter than the diameter of said cotter pin legs, said bores having parallel axes and being aligned in the axial direction with respect to said shaft, the axes of said bores being spaced apart a distance sufficient to admit said two legs of the cotter pin, but less than one diameter of said bores whereby said bores overlap in the center portion of said shaft,
   said cotter pin being held within the bores of said shaft.

2. The combination as claimed in claim 1 wherein said two leg portions are of different length, the longer leg being nearest the end of the shaft, and being bent outwardly.

3. The combination as claimed in claim 1 wherein the diameter of the innermost bore is larger than the diameter of the outer bore.

4. The combination as claimed in claim 1 wherein the legs of said cotter pin are formed of two separate pieces of wire, and ring means encircling said legs at the connected ends thereof.

References Cited by the Examiner

UNITED STATES PATENTS 1,986,586   1/55   Lovenston _____ 85—8.1

EDWARD C. ALLEN, *Primary Examiner.*